United States Patent Office 2,884,408
Patented Apr. 28, 1959

2,884,408

COMPOSITIONS OF POLYEPOXIDES AND POLY-CARBOXYLIC ACID ANHYDRIDES

Benjamin Phillips and Paul S. Starcher, Charleston, Charles W. McGary, Jr., South Charleston, and Charles T. Patrick, Jr., St. Albans, W. Va., assignors to Union Carbide Corporation, a corporation of New York No Drawing. Application June 1, 1956
Serial No. 588,605

52 Claims. (Cl. 260—78.3)

This invention is directed to polymerizable compositions, polymerized compositions obtained therefrom and methods for producing said compositions. More particularly, this invention relates to compositions which are useful in the arts of molding, coating, laminating, calendering, adhesives, and the like, for producing insoluble, infusible compositions.

It is known in the art to prepare resins from polyepoxides, such as reaction products of epichlorhydrin and polyphenols, and polycarboxylic acid anhydrides.

The present invention contemplates novel compositions comprising polyepoxide compounds not heretofore employed with polycarboxylic acid anhydrides wherein certain advantages are obtained. Polymerizable compositions of this invention can be cured to a gel in less than five minutes at about 100° C. and useful products can be obtained in less than 30 minutes of cure at about 160° C. A further advantage of these compositions is the ease by which the properties of a polymerized product can be controlled.

According to this invention, a polymerizable composition can be obtained by mixing a polycarboxylic acid anhydride with a polyepoxide compound which may be represented by the general formula:

(I) 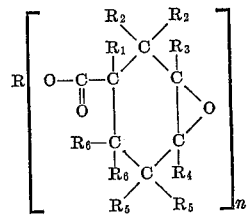

wherein, R represents an organic group selected from the class of divalent aliphatic, divalent oxa-aliphatic, i.e., a divalent aliphatic group having one or more intermediate ether linkages, and trivalent aliphatic groups; $R_1$, $R_2$, $R_3$, $R_4$, $R_5$ and $R_6$ represent groups from the class of hydrogen and alkyl groups having from 1 to 4 carbon atoms; and $n$ is an integer from 2 to 3. Preferred polyepoxides as represented by the foregoing formula are those characterized by said formula: wherein, however, R represents alkylene, oxa-alkylene and trivalent alkane groups and $R_1$ through $R_6$ and $n$ are as previously defined. By the term "oxa-alkylene" group, as used herein, is meant two or more alkylene groups formed by one or more oxygen atoms in ether linkage, e.g. a monoether group being represented by (—alkylene-O-alkylene—), a diether group being represented by (—alkylene-O-alkylene-O-alkylene—), and the like. Particularly preferred polyepoxides may be represented by Formula I wherein the total number of alkyl groups as represented by $R_1$, $R_2$, $R_3$, $R_4$, $R_5$ and $R_6$, attached to any one cyclohexane ring is not greater than five and the total number of carbon atoms contained by the alkyl groups attached to any one cyclohexane ring does not exceed 12. Useful compositions can also be obtained by mixing a polycarboxylic acid anhydride and a polycarboxylic compound with a polyepoxide compound as represented by Formula I.

Particularly useful compositions can be obtained, in accordance with this invention, by mixing a polyepoxide compound of the type characterized by Formula I, a polycarboxylic acid anhydride in an amount having X carboxy equivalents for each epoxy equivalent of said polyepoxide compound, and a polycarboxylic compound in an amount having Y carboxy equivalents for each epoxy equivalent of said polyepoxide compound, wherein X represents a number from 0.1 to 4.0, Y represents a number from 0.0 to 1.0, the sum of X and Y is not greater than 4.0 and the ratio of X/Y is at least 1. By the term "carboxy equivalent," as used herein, is meant the number of carboxy, —COOH, groups contained by an amount of a polycarboxylic compound, for example, the carboxy equivalency of one mole of a dicarboxylic acid is 2. In the case of a polycarboxylic acid anhydride, the term "carboxy equivalent," as used herein, is meant to indicate the number of carboxy, —COOH, groups which would be contained by an amount of the corresponding polycarboxylic acid from which the anhydride may be derived, for example, one mole of a dicarboxylic acid anhydride has a carboxy equivalency of 2. The use herein of the term "epoxy equivalent" is meant to indicate the number of epoxy groups

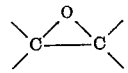

contained by an amount of polyepoxide compound. In determining the value of X/Y in the case where the denominator, Y, may be zero, the quotient of X/Y, as used herein, is taken to be equal to infinity which is greater than 1.

It is preferred, in order to produce more advantageous compositions, to mix a polyepoxide compound of the type characterized by Formula I, a polycarboxylic acid anhydride in an amount having X carboxy equivalents for each epoxy equivalent of said polyepoxide compound and a polycarboxylic compound in an amount having Y carboxy equivalents for each epoxy equivalent of said polyepoxide, wherein X is a number from 0.5 to 2.0, Y is a number from 0.0 to 1.0, the sum of X and Y is not greater than 2.0 and the ratio of X/Y is at least equal to 1.

Within the class of compounds characterized by Formula I are included aliphatic triol tris-(3,4-epoxycyclohexanecarboxylate) compounds as represented by the general formula:

(II) 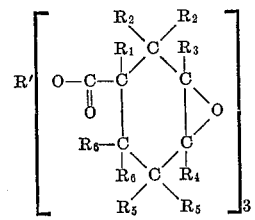

in which, R' represents a trivalent aliphatic group and $R_1$, $R_2$, $R_3$, $R_4$, $R_5$ and $R_6$ represent groups from the class of hydrogen and alkyl groups having from 1 to 4 carbon atoms. It is preferred, that the class of polyepoxide compounds characterized by Formula I include alkanetriol tris-(3,4-epoxycyclohexanecarboxylate) compounds which may be represented by Formula II, wherein, however, R' represents a trivalent alkane group having from 3 to 22 carbon atoms and no more than one valence on a single carbon atom, and $R_1$, $R_2$, $R_3$, $R_4$, $R_5$ and $R_6$ represent groups as previously defined. Particularly preferred triepoxide compounds may be characterized by Formula II, wherein, however, $R_2$, $R_3$, $R_4$ and $R_5$ represent hydrogen, and $R_1$ and $R_6$ represent hydrogen or alkyl groups having from 1 to 4 carbon atoms, and include alkanetriol tris-(3,4 - epoxycyclohexanecarboxylate), alkanetriol tris-(1-alkyl-3,4-epoxycyclohexanecarboxylate), alkanetriol tris-(6-alkyl - 3,4 - epoxycyclohexanecarboxylate), wherein the alkyl groups of the cyclohexane ring contain from 1 to 4 carbon atoms. Most particularly preferred triepoxide compounds characterized by Formula II include alkanetriol tris-(3,4-cyclohexanecarboxylate), alkanetriol tris-(1-methyl-3,4-epoxycyclohexanecarboxylate) and alkanetriol tris-(6,-methyl-3,4-epoxycyclohexanecarboxylate). More specifically, R' may represent trivalent alkane groups, such as those which may be regarded as the residues of triols without the hydroxyl groups. Representative triols, include those having not more than one hydroxyl group attached to a single carbon atom, for example, glycerol, trimethylolmethane, 1,1,1-trimethylolethane, 1,1,1 - trimethylolpropane, 1,2,6-hexanetriol, 1-allyloxy-2,4,6-trimethylolbenzene, 1-phenyl-1,2,3-propanetriol, 1,4-benzopyran-3,5,7-triol, and the like.

The polyepoxide compounds characterized by Formula II can be made by the epoxidation of aliphatic triol tris-(3-cyclohexenylcarboxylate) compounds with an epoxidizing agent, such as, acetaldehyde monoperacetate or peracetic acid, at low to moderate temperatures. Aliphatic triol tris-(3-cyclohexenecarboxylate) starting materials can be prepared, in accordance with known procedures, by condensing a 3-cyclohexenecarboxylic acid with an aliphatic triol. For example, a 3-cyclohexenecarboxylic acid and an aliphatic triol are mixed in a mol ratio of about three mols of acid per mol of triol and the mixture heated to a temperature in the range of 100° C. to 200° C. in an azeotrope-forming solvent, such as, toluene, benzene and the like. Water formed by the reaction is continuously removed by reflux and the polyester produced recovered as residue.

The various aliphatic triols which may be used to prepare aliphatic triol tris-(3-cyclohexenecarboxylate) starting materials include aliphatic triols, such as 1,2,3-propanetriol, trimethylolmethane, 1,1,1-trimethylolethane, 1,1,1 - trimethylolpropane, 1,2,6 - hexanetriol, cycloaliphatic triols and aromatic triols, such as 1-allyloxy-2,4,6-trimethylolbenzene, 1-phenyl-1,2,3-propanetriol, 1,4-benzopyran-3,5,7-triol, and the like.

Unsaturated cycloaliphatic carboxylic acids and, in particular, 3-cyclohexenecarboxylic acids, used in preparing aliphatic triol tris-(3-cyclohexenecarboxylate) compounds can be obtained by oxidation, according to known procedures, of 3 - cyclohexenylcarboxaldehydes. These 3-cyclohexenylcarboxaldehydes may be prepared by a Diels-Alder type reaction of butadiene or homologs of butadiene with alpha, beta unsaturated aliphatic aldehydes, such as, for example, acrolein, methacrolein, crotonaldehydes, and the like. Examples of combinations of reactants which may be employed in preparing 3-cyclohexenylcarboxaldehydes for subsequent oxidation to 3-cyclohexenecarboxylic acids include, acrolein and butadiene, acrolein and isoprene, crotonaldehyde and isoprene, methacrolein and isoprene, acrolein and 1,3-pentadiene, crotonaldehyde and pentadiene, methacrolein and pentadiene, acrolein and 2,3-dimethylbutadiene, crotonaldehyde and 2,3-dimethylbutadiene, methacrolein and 2,3-dimethylbutadiene, and the like. Thus the cyclohexenyl ring of the aliphatic triol tris-(3-cyclohexenecarboxylate) compounds may have a variety of alkyl substituents depending on the choice of starting materials.

The class of compounds characterized by Formula I also includes aliphatic diol bis-(3,4-epoxycyclohexanecarboxylate) compounds and preferably alkanediol and oxalkanediol bis-(3,4-epoxycyclohexanecarboxylate) compounds which may be represented by the general formula:

(III) 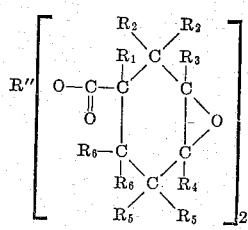

in which, R" represents a group from the class of divalent aliphatic and divalent oxa-aliphatic groups and preferably a group from the class of alkylene and oxaalkylene groups, and $R_1$, $R_2$, $R_3$, $R_4$, $R_5$ and $R_6$ are as previously defined. Particularly useful compositions can be prepared from diepoxides which may be represented by Formula III wherein, however, R" represents a group from the class of alkylene groups having from 2 to 18 carbon atoms and oxa-alkylene groups having from 5 to 50 carbon and oxygen atoms said oxygen atoms being separated from any other oxygen atom by at least two carbon atoms. More specifically, R" may represent alkylene groups such as ethylene, propylene, butylene, pentylene, hexylene, heptylene, octylene, and the like, and derivatives thereof. Also, R" may represent oxa-alkylene groups such as 3-oxapentylene, —$(CH_2)_2O(CH_2)_2$—, 3,6-dioxaoctylene, —$(CH_2)_2O(CH_2)_2O(CH_2)_2$—, 3,6,9-trioxaundecylene

—$(CH_2)_2O(CH_2)_2O(CH_2)_2O(CH_2)_2$—

4-oxaheptylene, —$(CH_2)_3O(CH_2)_3$—, 4,8-dioxaundecylene, —$(CH_2)_3O(CH_2)_3O(CH_2)_3$—, 4,8,12 - trioxapentadecylene, —$(CH_2)_3O(CH_2)_3O(CH_2)_3O(CH_2)_3$—, 2-methyl - 3 - oxapentylene, 2,5-dimethyl-3,6-dioxaoctylene, 2,5,8-trimethyl-3,6,9-trioxaundecylene, and the like. It is further preferred that $R_2$, $R_3$, $R_4$ and $R_5$ represent hydrogen and $R_1$ and $R_6$ represent hydrogen and alkyl groups containing from 1 to 4 carbon atoms. Particularly preferred alkanediol and oxa-alkanediol bis-(3,4-epoxycyclohexanecarboxylate) compounds include alkanediol bis - (3,4 - epoxycyclohexanecarboxylate), oxaalkanediol bis - (3,4 - epoxycyclohexanecarboxylate), alkanediol bis-(1 - alkyl-3,4-epoxycyclohexancarboxylate) oxa-alkanediol bis-(1-alkyl-3,4-epoxycyclohexanecarboxylate), alkanediol bis-(6-alkyl-3,4-epoxycyclohexanecarboxylate) and oxa-alkanediol bis-(6-alkyl-3,4-epoxycyclohexanecarboxylate), wherein the alkyl groups contain from 1 to 4 carbon atoms. Most particularly preferred diepoxide compounds include alkanediol bis-(3,4-epoxycyclohexanecarboxylate), oxa-alkanediol bis-(3,4-epoxycyclohexanecarboxylate), alkanediol bis-(1-methyl-3,4-epoxycyclohexanecarboxylate), oxa - alkanediol bis-(1-methyl-3,4-epoxycyclohexanecarboxylate), alkanediol bis-(6-methyl - 3,4 - epoxycyclohexanecarboxylate) and oxa-alkanediol bis-(6 - methyl-3,4-epoxycyclohexanecarboxylate). The term "oxa-alkanediol," as used herein, is meant to include alkanediols having one or more intermediate ether linkages, as for example, diethylene glycol, dipropylene glycol and the like.

The polyepoxide compounds characterized by Formula III can be obtained by epoxidizing the ethylenic double bonds of aliphatic diol bis-(3-cyclohexenylcarboxylate) compounds with an epoxidizing agent, such as acetaldehyde monoperacetate or peracetic acid at low to moderate temperatures. The organic diol bis-(3-cyclohexenecarboxylate) compounds themselves, may be prepared by reacting, in accordance with known condensation techniques, a 3-cyclohexenecarboxylic acid and an organic diol. Suitable 3-cyclohexenecarboxylic acids for preparing organic diol bis-(3-cyclohexenecarboxylate) compounds include 3-cyclohexenecarboxylic acid, and alkyl-substituted 3-cyclohexenecarboxylic acid, such as, 6-methyl-3-cyclohexenecarboxylic acid, 1-methyl-3-cyclohexenecarboxylic acid, 2-methyl-3-cyclohexenecarboxylic acid, 3-methyl-3-cyclohexenecarboxylic acid, 4-methyl-3-cyclohexenecarboxylic acid, 5-methyl-3-cyclohexenecarboxylic acid and the like. Organic diols suitable for making organic diol bis-(3-cyclohexenecarboxylate) compounds include dihydric compounds, such as, ethylene glycol, diethylene glycol, triethylene glycol, tetraethylene glycol, 1,2-propylene glycol, 1,3-propylene glycol, the dipropylene glycols, the tripropylene glycols, the polyoxyethylene glycols, the polyoxypropylene glycols, 1,2-butylene glycol, 1,4-butylene glycol, 1,5-pentanediol, 2,4-pentanediol, 2,2-dimethyltrimethylene glycol, 1,4-hexanediol, 1,5-hexanediol, 1,6-hexanediol, 2,5-hexanediol, 3-methyl-1,5-pentanediol, 2 - methyl - 2,5 - pentanediol, 3-methyl-2,5-pentanediol, 2,2-diethyl-1,3-propanediol, 2-ethyl-1,3-hexanediol, 2,5-dimethyl-2,5-hexanediol, 1,12-octadecanediol, 1-butene-3,4-diol, 2-butene-1,4-diol, 2-butyne-1,4-diol, 2-butyne-1,4-diol, 2,5-dimethyl-3-hexyne-2,5-diol, and the like.

Unsaturated cycloaliphatic carboxylic acids and, in particular, 3-cyclohexenecarboxylic acids used in preparing organic diol bis-(3-cyclohexenylcarboxylate) compounds can be obtained by oxidation, according to known procedures, of 3-cyclohexenylcarboxaldehydes. These 3-cyclohexenylcarboxaldehydes may be prepared by a Diels-Alder type reaction of butadiene or homologues of butadiene with aliphatic aldehydes, and, particularly, alpha, beta-unsaturated aliphatic aldehydes, such as, for example, acrolein, methacrolein, crotonaldehyde, and the like. Examples of combinations of reactants which may be employed in preparing 3-cyclohexenylcarboxaldehydes for subsequent oxidation to 3-cyclohexenecarboxylic acids include, acrolein and butadiene, crotonaldehyde and butadiene, methacrolein and butadiene, acrolein and isoprene, crotonaldehyde and isoprene, methacrolein and isoprene, acrolein and 1,3-pentadiene, crotonaldehyde and pentadiene, methacrolein and pentadiene, acrolein and 2,3-dimethylbutadiene, crotonaldehyde and 2,3-dimethylbutadiene, methacrolein and 2,3-dimethylbutadiene, and the like.

Polycarboxylic acid anhydrides which can be used in the polymerizable compositions of this invention include aliphatic dicarboxylic acid anhydrides, such as, succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride; cycloaliphatic dicarboxylic acid anhydrides, such as, hexahydrophthalic anhydride, hexachlorphthalic anhydride, tetrahydrophthalic anhydride, methyltetrahydrophthalic anhydride, tetrachlorphthalic anhydride; hexachloroendomethylene-tetrahydrophthalic anhydride, tetrabromophthalic anhydride, tetraiodophthalic anhydride; aromatic dicarboxylic acid anhydrides, such as, phthalic anhydride, 4-nitrophthalic anhydride, 1,2-naphthalic anhydride, 1,8-naphthalic anhydride, 2,3-naphthalic anhydride; tetracarboxylic acid dianhydrides, such as, 1,2,4,5-benzenetetracarboxylic dianhydride; polymeric dicarboxylic acid anhydrides, such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in the polymerizable compositions of this invention include the Diels-Alder adducts of maleic acid and aliphatic compounds having conjugated double bonds. Preferred polycarboxylic acid anhydrides are the aliphatic hydrocarbon dicarboxylic acid anhydrides, the cycloaliphatic hydrocarbon dicarboxylic acid anhydrides and the aromatic hydrocarbon dicarboxylic acid anhydrides.

Polycarboxylic compounds which may be used in the compositions of this invention are compounds which contain two or more free carboxy groups per molecule. More particularly, representative polycarboxylic compounds are polycarboxylic acids including such dicarboxylic acids, as oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alpha-hydromuconic acid, beta-hydromuconic acid, diglycolic acid, dilactic acid, dithioglycolic acid, 4-amyl-2,5-heptadienedioic acid, 3-hexynedioic acid, 4,6-decadiynedioic acid, 2,4,6,8-decatetraenedioic acid, 1,2-cyclohexanediacid, 2,4,6,8-decatetraenedioic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorphthalic acid, 1,8-naphthalenedicarboxylic acid, 3-carboxycinnamic acid, 1,2-naphthalenedicarboxylic acid, and the like; tricarboxylic acids, such as 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid, 1,3,5 - benzenetricarboxylic acid, and the like; tetracarboxylic acids, such as 3-hexene-2,2,3,4-tetracarboxylic acid, 1,2,3,4-benzenetetracarboxylic acid, 1,2,3,5-benzenetetracarboxylic acid, 1,2,4,5-benzenetetracarboxylic acid, and the like; pentacarboxylic acids, such as benzenepentacarboxylic acid; and hexacarboxylic acids, such as benzenehexacarboxylic acid and the like. Preferred polycarboxylic acids include aliphatic hydrocarbon dicarboxylic acids, cycloaliphatic hydrocarbon dicarboxylic acids and aromatic hydrocarbon dicarboxylic acids.

Among the polycarboxylic compounds which can be used are compounds containing ester groups and two or more carboxyl groups and can be aptly termed polycarboxy polyesters of polycarboxylic acids, such as those listed above, or the corresponding anhydrides of said acids, with polyhydric alcohols. By the term "polycarboxy polyesters," as used herein, is meant polyesters containing two or more free carboxy group per molecule. These polycarboxy polyesters can be prepared by known condensation procedures, employing mole ratios favoring greater than equivalent amounts of polycarboxylic acid, or anhydride. More specifically, the amount of polycarboxylic acid, or anhydride, employed in the esterification reaction should contain more carboxy groups than are required to react with the hydroxyl groups of the amount of polyhydric reactant. In forming polycarboxy polyesters that are useful in the compositions of this invention, it is preferable to use hydrocarbon dicarboxylic acids or anhydrides.

Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, pentane-1,5-diol, pentane-2,4-diol, 2,2-dimethyltrimethylene glycol, hexane-1,4-diol, hexane-1,5-diol, hexane-1,6-diol, hexane-2,5-diol, 3-methylpentane-1,5-diol, 2-methylpentane-2,5-diol, 3-methylpentane-2,5-diol, 2,2-diethylpropane - 1,3-diol, 2-ethylhexane-1,3-diol, 2,5-dimethylhexane-2,5-diol, octadecane-1,12-diol, 1-butene-3,4-diol, 2 - butene - 1,4,-diol, 1,5-hexadiene-4,5-diol, 2-butyne-1,4-diol, 2-hexyne-2,5-diol, 2,5-dimethyl-3-hexyne-2,5-diol, and the like; trihydric compounds such as glycerol, trimethylolmethane, hexane-1,2,6-triol, 1,1,1-trimethylolpropane, and the like; tetrahydric compounds, such as pentaerythritol, diglycerol, and the like; and higher polyhydric compounds such as pentaglycerol, dipentaerythritol, polyvinyl alcohols and the like. Additional polyhydric alcohols useful in making polycarboxy polyesters can be prepared by the reaction of epoxides, e.g., diglycidyl ethers of 2,2-propane bis-phenol, and reactive hydrogen-containing organic compounds, e.g., amines, polycarboxylic acids, polyhydric compounds and the like. In forming the polycarboxy polyesters that can be employed in the compositions of this invention it is preferable to use a dihydric, trihydric or tetrahydric aliphatic or oxa-aliphatic alcohol.

The mole ratios in which the polycarboxylic acid or anhydride can be reacted with polyhydric compounds in preparing polycarboxylic polyesters useful in the compositions of this invention are limited to those which provide polyesters having more than one carboxy group per molecule. In the case of trifunctional and tetrafunctional reactants in the esterification reaction, the mole ratios of the respective reactants must be such as to avert gelation. The mole ratio ranges of dicarboxylic acid to polyhydric compounds that have been found to provide polycarboxylic polyesters which can be used in the compositions of this invention are presented in Table I.

TABLE I

| Polyhydric Compound | Mole Ratio of Dicarboxylic Acid or Anhydride to Polyhydric Compound |
|---|---|
| Dihydric Compound | 1.1 to 2.0 |
| Trihydric Compound | 2.2 to 3.0 |
| Tetrahydric Compound | 3.3 to 4.0 |

It is preferred, however, to employ polycarboxylic polyesters prepared from dicarboxylic acids or anhydrides and polyhydric compounds in the mole ratios specified in Table II.

TABLE II

| Polyhydric Compound | Mole Ratio of Dicarboxylic Acid or Anhydride to Polyhydric Compound |
|---|---|
| Dihydric Compound | 1.5 to 2.0 |
| Trihydric Compound | 2.5 to 3.0 |
| Tetrahydric Compound | 3.5 to 4.0 |

The polycarboxy polyesters described above can be obtained by condensing, in accordance with known procedures, a polyhydric compound and a polycarboxylic acid or anhydride. This condensation reaction may be conducted, for example, by heating the reactants to a temperature within the range from 100° C. to 200° C. with or without an acidic catalyst. Water formed by the condensation reaction may be removed by distillation. The course of the reaction may be followed by making acid number determinations and the reaction can be stopped when a suitable polycarboxy polyester has been obtained.

The polymerizable compositions of this invention are heat-curable into cured compositions. This may be accomplished by heating the polymerizable compositions to a temperature in the range of 25° C. to 200° C. thus first forming a gel or partially cured composition. The gel then can be cured at a temperature up to 250° C. and higher to produce the polymerized compositions of this invention. It is preferred, however, to form a gel at temperatures in the range of 100° C. to 130° C. and to cure the gel at temperatures in the range of 130° C. to 180° C.

The time required to form a gel from these polymerizable compositions can be effectively reduced by increasing the curing temperature. The time required to effect a complete cure can be likewise reduced by increasing the curing temperature. Gel-times, i.e., the time required to form a gel, can be reduced by employing more reactive polycarboxylic acid anhydrides in the polymerizable compositions. While not wishing to be restricted to any particular rigid principle; it has been observed that polymerizable compositions containing the more acidic polycarboxylic acid anhydrides such as hexachloroendomethylenetetrahydrophthalic anhydrides, maleic anhydride, and the like, gel in shorter times than polymerizable compositions containing less acidic polycarboxylic acid anhydrides, such as azelaic anhydride, sebacic anhydride, and the like.

Acidic and basic catalysts may not be necessary to carry out curing although they may be employed, as desired, to promote a more rapid cure. These catalysts can be added to the polymerizable compositions in amounts of .001 to 5 weight percent based upon the total weight of compositions. Basic catalysts which may be employed include pyridine, aniline, benzyldimethylamine, benzyltrimethylammonium hydroxide, dilute alkali hydroxides, and the like. Suitable acidic catalysts include sulfuric acid, phosphoric acid, perchloric acids, and Friedel-Crafts catalysts, e.g., stannic chloride, zinc chloride, ferric chloride, boron trifluoride, aluminum chloride, and the like.

Curing may be conducted by any of the known polymerization procedures including bulk, solvent or emulsion polymerization procedures. It is prefererd, however, to employ a bulk polymerization procedure wherein a melt of the polymerizable composition is first produced so as to form a homogeneous mixture. This mixture then can be maintained at the curing temperature to form a polymerized composition. While not wishing to be held to any particular theory or mechanics of reactions, it is thought that the epoxy groups of the polyepoxides are difunctional when reacted with polycarboxylic acid anhydrides, such that, the equivalent of two carboxy groups of the polycarboxylic acid anhydride reacts with a single epoxy group of the polyepoxide. It is believed also that some etherification through the epoxy groups of the polyepoxide is also brought about during the curing operation.

The polymerized compositions formed by the practice of this invention are tough, transparent, nearly colorless, infusible, insoluble in organic solvents and resistant to strong acids. They can be obtained as tough, flexible products, as hard, rigid products or as products having intermediate degrees of flexibility and rigidity through the selection of starting materials. Polymerized compositions produced from longer chain diepoxide compounds or longer chain polycarboxylic acid anhydrides, or both, tend to be more flexible than polymerized compositions made from shorter chain diepoxide compounds, or shorter chain polycarboxylic acid anhydrides, or both, although no rigid principles are intended to be drawn.

Still not wishing to be held to any particular principle, triepoxide compounds, or polycarboxylic acid anhydrides, or both, tend to produce more rigid products than diepoxide compounds, or dicarboxylic acid anhydrides, or both, when employed in the polymerization compositions of this invention. Polymerizable compositions containing polycarboxylic compounds tend to form more flexible products when cured than compositions not containing such acids. Although no theory, or mechanics of reaction, is intended to be drawn, it is believed that the epoxy groups of the diepoxides are difunctional when reacted with anhydrides and monofunctional when reacted with dicarboxylic acids. Thus, it is believed that cross-linking through esterification is brought about when dicarboxylic acid anhydrides are employed, whereas, linear esterification is brought about when dicarboxylic acids are employed in the curable compositions. Thus, through the selection of specific polyepoxide compounds and polycarboxylic compounds, or by the addition of small amounts of polycarboxylic compounds, products having desired, specific properties may be obtained.

The polymerizable compositions of this invention are useful in the formulation of molding compositions. By curing these polymerizable compositions to form a gel and stopping the cure, a heat hardenable composition may be obtained and can be granulated or reduced to powder form for use as a molding composition with or without other ingredients, such as, pigments, fillers and so on. Other applications for the polymerizable compositions of this invention include uses as adhesives, coatings and films.

The following examples are presented.

*Example 1*

PREPARATION OF DIETHYLENE GLYCOL BIS-(6-METH-YL-3,4-EPOXYCYCLOHEXANECARBOXYLATE)

Two hundred and ninety-seven grams of diethylene glycol bis-(6-methyl-3-cyclohexenecarboxylate) were added dropwise, over a two hour period, with stirring at a temperature of 25–30° C., to 670 grams of a 21.2 percent solution of peracetic acid in acetone (161 grams, 2.122 mols of peracetic acid). The reaction solution was maintained at the above-mentioned temperature by immersing the flask in a water bath and after addition was complete, the reaction conditions were maintained for an additional four hours whereupon the solution was stored for sixteen hours at −11° C.

The reaction solution was then fed dropwise into a still kettle containing 1000 grams of ethylbenzene refluxing at 45° C. at 35 mm. of Hg pressure and acetone, acetic acid, peracetic acid, and ethylbenzene were distilled off. After addition was complete, the product was stripped of low-boiling constituents up to a kettle temperature of 90° C. at 2 mm. of Hg pressure. There was obtained as residue product, 330 grams of amber-colored viscous liquid which analyzed 86.4 percent purity as diethylene glycol bis-(6-methyl-3,4-epoxycyclohexanecarboxylate) by analysis for epoxide groups and 13.0 percent as unreacted diethylene glycol bis-(6-methyl-3-cyclohexenecarboxylate) by analysis for double bonds. The yield was 87.8 percent of theory.

*Example 2*

PREPARATION OF ETHYLENE GLYCOL BIS-(3,4-EPOXYCYCLOHEXANECARBOXYLATE)

Sixteen hundred eighty grams of a 24.9 percent solution of peracetic acid in acetone (418 grams, 5.5 mols, of peracetic acid) were fed dropwise over a period of four hours to 613 grams (2.2 mols) of ethylene glycol bis-(3-cyclohexenecarboxylate) with stirring at 35–40° C. On completion of the addition, the reaction was allowed to proceed under the same conditions for an additional four hours and then the reaction solution was stored for sixteen hours at −11° C. At this time, analysis showed that 98.8 percent of the preacetic acid had been consumed.

The reaction solution was dissolved in 1600 grams of ethylbenzene and then distilled to remove all low-boiling constituents up to a kettle temperature of 70° C. and 2 mm. of Hg pressure. There were obtained 614 grams of residue product which analyzed 83.8 percent as ethylene glycol bis-(3,4-epoxycyclohexanecarboxylate) by analysis for epoxide groups, 5.0 percent unreacted ethylene glycol bis-(3-cyclohexenecarboxylate) by analysis for double bonds, and 0.5 percent acidic impurities calculated as acetic acid. The yield was 75.4 percent of theory.

*Example 3*

PREPARATION OF 1,6-HEXANEDIOL BIS-(3,4-EPOXYCYCLOHEXANECARBOXYLATE)

Five hundred and eighty-four grams of 1,6-hexanediol bis-(3-cyclohexenecarboxylate) (1.75 mols) were placed in a flask and 1560 grams of a 25.5 percent solution of peracetic acid in acetone was added over a four hour period. The reaction was exothermic and the solution was maintained at 35–40° C. by cooling with an ice water bath as required. After the addition was complete, the reaction conditions were maintained for an additional one hour.

The reaction solution was fed dropwise into a still kettle containing 1750 grams of ethylbenzene refluxing at 25 mm. of Hg pressure. Acetone, acetic acid, peracetic acid, and ethylbenzene were distilled off at the head during the addition period. After all of the reaction solution had been added, the residue product was stripped of ethylbenzene and there were obtained 665 grams of product analyzing 88.6 percent as 1,6 - hexanediol bis - (3,4-epoxycyclohexanecarboxylate) by analysis for epoxide groups and 3.5 percent as unreacted diene by analysis for double bonds. The yield of diepoxide corresponded to 92 percent of theory.

*Example 4*

PREPARATION OF TRIETHYLENE GLYCOL BIS-(3,4-EPOXYCYCLOHEXANECARBOXYLATE)

Nine hundred fifty-five grams of a 21.0 percent solution of peracetic acid in acetone (200 grams, 2.64 mols, of peracetic acid) were fed dropwise over a period of three hours fifteen minutes to 322 grams (0.88 mol) of triethylene glycol bis-(3-cyclohexenecarboxylate) with stirring. The reaction was very exothermic and the temperature of the reaction solution was maintained at 40–50° C. by immersing the flask in a cold water bath. After addition was complete, the reaction conditions were maintained for an additional two and one-half hours, at which time analysis indicated that all of the peracetic acid had been consumed.

The reaction solution was stored for sixteen hours at −11° C. and then added dropwise to a still kettle containing 2500 grams of ethylbenzene refluxing at 40 mm. of Hg. pressure. Acetone, acetic acid, peracetic acid and ethylbenzene were distilled off at the top of the kettle during the addition and the kettle residue was finally stripped of low-boiling constituents up to 70° C. at 3 mm. of Hg pressure. There were obtained 355 grams of viscous liquid analyzing 79.6 percent as triethylene glycol bis-(3-cyclohexenecarboxylate) by analysis for double bonds. The yield of diepoxide was 80.8 percent of theory.

*Example 5*

PREPARATION OF 1,1,1-TRIMETHYLOLPROPANE TRIS-(3,4-EPOXYCYCLOHEXANECARBOXYLATE)

Six hundred and forty-one grams (1.4 mols) of 1,1,1-trimethylolpropane tris-(3-cyclohexenylcarboxylate) were added to a five-liter flask fitted with a stirrer thermometer and dropping funnel. The flask and contents were heated to a temperature of 30° C. to 35° C. with stirring. Over a period of four hours, 1980 grams of a 24.2 weight percent solution of peracetic acid in acetone (479 grams or 6.3 mols of peracetic acid) were added dropwise to the flask. During this dropwise addition, the flask was immersed in a water bath to maintain the reaction temperature at about 30° C. to 35° C. After all the peracetic acid solution had been added, the reaction was allowed to continue for an additional three hours. The reaction mixture then was stored for 16 hours at about −11° C. and after this time was added dropwise to 2500 grams of ethylbenzene refluxing at 25 millimeters of mercury absolute pressure. During the addition, acetone, acetic acid, peracetic acid and ethylbenzene were distilled off and after the addition was completed, all low-boiling material was stripped off at a kettle temperature of not greater than 70° C. There was obtained 718 grams of a residue product which was analyzed as containing 93.6 weight percent of 1,1,1-trimethylolpropane tris-(3,4-epoxycyclohexanecarboxylate) by determination of epoxide groups, 4.86 weight percent of 1,1,1-trimethylolpropane tris-(3-cyclohexenylcarboxylate) by determination of double bonds, and 0.7 weight percent of acidic impurities which were determined as acetic acid. The yield of 1,1,1-trimethylolpropane tris-(3,4-epoxycyclohexanecarboxylate) was calculated at 95 percent.

Example 6

PREPARATION OF 1,2,3-PROPANETRIOL TRIS-(3,4-EPOXYCYCLOHEXANECARBOXYLATE)

Seven hundred and thirty-seven grams (1.77 mols) of 1,2,3-propanetriol tris-(3-cyclohexenylcarboxylate) were placed in a five-liter, four-neck flask fitted with a dropping funnel, reflux condenser, stirrer and thermometer. The flask and contents were heated to a temperature between 30° C. and 35° C. with stirring. Over a period of five hours, 2480 grams of a 24.2 weight percent solution of peracetic acid in acetone (said solution containing 605 grams of peracetic acid) were added dropwise to the flask. During the dropwise addition of peracetic acid solution, the flask was maintained at a temperature between 30° C. and 35° C. by immersion in a water bath. After all of the peracetic acid solution had been aded, the reaction was allowed to continue for an additional 1.5 hours. The reaction mixture was stored in a cold bath at an approximate temperature of −11° C. overnight. Then, the reaction mixture was added dropwise to about 2060 grams of ethylbenzene which was refluxing at 25 millimeters of mercury absolute pressure. During the addition, acetone, acetic acid, peracetic acid and ethylbenzene were distilled off and, after completion of the addition, all low-boiling materials were stipped off at a kettle temperature below 70° C. There was obtained 866 grams of a residue product which was analyzed as containing 63.8 weight percent of 1,2,3-propanetriol tris-(3,4-epoxycyclohexanecarboxylate) by epoxide determination, 9.65 weight percent of 1,2,3-propanetriol tris-(3-cyclohexenylcarboxylate) by determination of double bonds and 0.22 weight percent of acidic impurities which were determined as acetic acid. The yield of 1,2,3-propanetriol tris-(3,4-epoxycyclohexanecarboxylate) was calculated at 67.4 percent.

Example 7

COMPOSITIONS OF 1,6-HEXANEDIOL BIS-(3,4-EPOXYCYCLOHEXANECARBOXYLATE AND MALEIC ANHYDRIDE

A mixture containing 1.83 grams of 1,6-hexanediol bis-(3,4-epoxycloclohexanecarboxylate) and 0.29 gram of maleic anhydride was prepared. The amounts of 1,6-hexanediol and maleic anhydride in the mixture were such as to provide a 6 carboxy equivalent of the anhydride for each epoxy equivalent of the diepoxide. The mixture was heated until a homogeneous melt was obtained. The temperature of the melt was maintained at about 120° C. The melt formed a gel within 46 minutes at this temperature. The gel was then subjected to a curing temperature of about 160° C. and was given a strong cure for about four hours. A tough flexible product was obtained.

Examples 8–13

COMPOSITIONS OF 1,6-HEXANEDIOL BIS-(3,4-EPOXYCYCLOHEXANECARBOXYLATE) AND DICARBOXYLIC ACID ANHYDRIDES

There were prepared six mixtures comprising the amounts of 1,6-hexanediol bis-(3,4-epoxycyclohexanecarboxylate) specified in Table III below and the amounts of dicarboxylic acid anhydrides also specified in the table below.

TABLE III

| Example Number | Dicarboxylic Acid Anhydride | Weight of Anhydride (g.) | Weight of Diepoxide (g.) |
|---|---|---|---|
| 8 | Succinic | 2.02 | 7.3 |
| 9 | Phthalic | 0.7 | 1.8 |
| 10 | Dichloromaleic | 0.8 | 1.8 |
| 11 | Methyltetrahydrophthalic anhydride | 0.8 | 1.8 |
| 12 | Itaconic | 0.6 | 1.8 |
| 13 | Polymeric adipic | 0.6 | 1.8 |

The amounts of diepoxide and anhydride in each of the mixtures provided 1 carboxy equivalent for each epoxy equivalent. The mixtures were heated until a uniform melt was obtained. Each of the six mixtures were maintained at a temperature of about 130° C. and gels were formed in the times correspondingly listed in Table IV, below. Each gel was subjected to a curing temperature of about 160° C. for six hours and products having properties respectively listed in the table below were obtained.

TABLE IV

| Example Number | Gel Time (hours) | Properties of Product |
|---|---|---|
| 8 | 5 | Flexible, Barcol hardness, 5. |
| 9 | 2 | Hard, Barcol hardness, 20. |
| 10 | 0.05 | Hard, dark colored, strong. |
| 11 | 4 | Hard, strong. |
| 12 | 2 | Hard, dark colored, strong. |
| 13 | 2 | Flexible, soft. |

Example 14

COMPOSITIONS OF 1,6-HEXANEDIOL BIS-(3,4-EPOXYCYCLOHEXANECARBOXYLATE) AND CHLORENDIC[1] ANHYDRIDE

A mixture containing 1.83 grams of 1,6-hexanediol bis-(3,4-epoxycyclohexanecarboxylate) and 1.0 gram of chlorendic[1] anhydride was prepared. The amounts of diepoxide and anhydride were such as to provide a 6 carboxy equivalent for each epoxy equivalent of the diepoxide. The mixture was heated until a homogeneous melt was obtained. A gel formed almost immediately upon the formation of a homogeneous melt. The gel was then subjected to a temperature of 160° C. for a period of four hours and there was obtained a tough, solid flexible brown colored resin.

Example 15

COMPOSITIONS OF DIETHYLENE GLYCOL BIS-(3,4-EPOXY-6-METHYLCYCLOHEXANECARBOXYLATE) AND PHTHALIC ANHYDRIDE

A mixture comprising 7.64 grams of diethylene glycol bis-(3,4-epoxy-6-methylcyclohexanecarboxylate) and 2.96 grams of phthalic anhydride was prepared. This mixture contained such amounts of diepoxide and anhydride that there was provided 1 carboxy equivalent of anhydride for each epoxy equivalent of diepoxide. The mixture was maintained at a temperature of 120° C. for 50 minutes during which time gel was formed. The gel was then subjected to a strong cure at a temperature of 160° C. for a period of 1 hour after which time tough, solid product having a Barcol hardness of 20 was obtained. This product was then maintained at a temperature of 160° C. for an additional 30 minutes after which the product was found to have a Barcol hardness of 30. This product was maintained at 160° C. for still an additional 30 minutes after which time it exhibited a Barcol hardness of 32.

Examples 16–23

COMPOSITIONS OF 1,6-HEXANEDIOL BIS-(3,4-CYCLOHEXANECARBOXYLATE) AND PHTHALIC ANHYDRIDE

Eight mixtures were prepared from 1,6-hexanediol bis-(3,4-cyclohexanecarboxylate) and phthalic anhydride in the amounts specified in Table V below. The mixtures were maintained at a temperature of about 120° C. for four hours. Each mixture then was subjected to a strong post cure at a temperature of about 160° C. for a period of six hours. There was obtained a product from each of the cured mixtures; the properties of each product being correspondingly listed in the table below.

[1] Hexachloroendomethylenetetrahydrophthalic anhydride.

TABLE V

| Example Number | Weight of Diepoxide | Weight of Anhydride | Carboxy Equiv./ Epoxy Equiv. | Properties of Product |
|---|---|---|---|---|
| 16 | 1.8 | 0.2 | 0.2 | Soft resin. |
| 17 | 8.3 | 1.7 | 0.5 | Flexible. |
| 18 | 7.1 | 2.9 | 1.0 | Hard, Barcol 23. |
| 19 | 6.2 | 3.8 | 1.5 | Hard, Barcol 22. |
| 20 | 5.5 | 4.5 | 2.0 | Hard, Barcol 10. |
| 21 | 0.9 | 1.1 | 3.0 | Soft resin. |
| 22 | 0.9 | 1.5 | 4.1 | Solid, heterogeneous. |
| 23 | 0.9 | 1.8 | 5.0 | Do. |

Examples 24–28

COMPOSITIONS OF 1,6-HEXANEDIOL BIS-(3,4-EPOXY-CYCLOHEXANECARBOXYLATE) AND PHTHALIC ANHYDRIDE

A mixture was prepared from 1.8 grams of 1,6-hexanediol bis-(3,4-epoxycyclohexanecarboxylate) and 0.74 gram of phthalic anhydride. The amounts of 1,6-hexanediol bis-(3,4-epoxycyclohexanecarboxylate) and phthalic anhydride provided 1 carboxy equivalent of anhydride for each epoxy equivalent of the diepoxide. To four mixtures prepared as the described above were added various catalysts as specified in Table VI below at the concentrations corresponding those listed in said table. Each of the mixtures thus obtained were maintained at a temperature of about 110° C. A gel was formed from each mixture in the time specified in the table below:

TABLE VI

| Example Number | Catalyst | Catalyst Concentration (weight percent) | Gel Time (minutes) |
|---|---|---|---|
| 24 | Potassium hydroxide | 0.04 | 7 |
| 25 | Dimethylbenzylamine | 0.8 | 2 |
| 26 | Zinc chloride | 0.8 | 2 |
| 27 | Stannic chloride | 0.04 | 30 |
| 28 | None | | 120 |

Examples 29–35

COMPOSITIONS OF POLYEPOXIDES AND PHTHALIC ANHYDRIDE

A series of seven mixtures were prepared each containing an amount of polyepoxide and an amount of phthalic anhydride as specified in Table VII below.

TABLE VII

| Example Number | Diepoxide | Weight of Diepoxide (g.) | Weight of Phthalic Anhydride (g.) |
|---|---|---|---|
| 29 | 2-Ethyl-1,3-hexanediol bis-(3,4-epoxycyclo-hexanecarboxylate) | 36.4 | 13.6 |
| 30 | Diethylene glycol bis-(3,4-epoxy-6-methyl-cyclohexanecarboxylate) | 36.0 | 14.0 |
| 31 | 3-Methyl-1,5-pentanediol bis-(3,4-epoxycyclohexanecarboxylate) | 35.7 | 14.3 |
| 32 | Triethylene glycol bis-(3,4-epoxy-cyclohexanecarboxylate) | 36.5 | 13.5 |
| 33 | Ethylene glycol bis-(3,4-epoxy-6-methyl-cyclohexanecarboxylate) | 34.8 | 15.2 |
| 34 | 2,2-Diethyl-1,3-propane-diol bis-(3,4-epoxycyclohexanecarboxylate) | 36.1 | 13.9 |
| 35 | 1,6-Hexanediol bis-(3,4,-epoxycyclohexanecarboxylate) | 21.3 | 8.7 |

In each of these mixtures the amount of polyepoxide and the amount of anhydride provided 1 carboxy equivalent of the anhydride for each epoxy equivalent of the polyepoxide. To each of these mixtures was added an amount of a solution of potassium hydroxide in methanol providing .02 weight percent of potassium hydroxide based on the total weight of each mixture. Each of the seven mixtures were heated until a uniform melt was obtained. The melts from each mixture were maintained at a temperature of about 130° C. for a period of 3 hours and, subsequently, were maintained at a temperature of about 160° C. for 6 hours. Bars were cast from each of the materials shown in Table VIII, below and had the properties presented in said table.

TABLE VIII

| Example Number | Izod Impact, ft. lb./in. of notch | Heat Distortion, °C., 264 lb./sq. in. | Barcol Hardness |
|---|---|---|---|
| 29 | 0.21 | 84 | 26 |
| 30 | 0.47 | 114 | 30 |
| 31 | 0.30 | 95 | 23 |
| 32 | 0.51 | 60 | 20 |
| 33 | 0.42 | 96 | 32 |
| 34 | 0.34 | 115 | 32 |
| 35 | 0.23 | 101 | 27 |

Example 36

COMPOSITION OF 1,2,3-PROPANETRIOL TRIS-(3,4-EPOXYCYCLOHEXANECARBOXYLATE) AND MALEIC ANHYDRIDE

A mixture was prepared from 6.2 grams of 1,2,3-propanetriol tris-(3,4-epoxycyclohexanecarboxylate) and 1.96 grams of maleic anhydride. The amounts of anhydride and diepoxide in the mixture provided 1 carboxy equivalent for each epoxy equivalent. The mixture was maintained at 120° C. for a period of 3 minutes during which time a gel formed. The gel was subjected to a strong cure at 160° C. for 1.5 hours. A dark brown, hard brittle product having a Barcol hardness of 46 was obtained.

Example 37

COMPOSITION OF 1,1,1-TRIMETHYLOLPROPANE TRIS-(3,4-EPOXYCYCLOHEXANECARBOXYLATE) AND SUCCINIC ANHYDRIDE

A mixture was prepared from 10.1 grams of 1,1,1-trimethylolpropane tris-(3,4-epoxycyclohexanecarboxylate) and 2.0 grams of succinic anhydride. The above specified amounts of triepoxide and anhydride provided .7 carboxy equivalents of the anhydride for each epoxy equivalent of the triepoxide. The mixture was heated until a uniform melt was obtained. This melt was subjected to a temperature of 130° C. for a period of two hours, during which time a gel was formed. The gel thus formed was maintained at a temperature of about 160° C. for six hours and an amber colored, strong product having a Barcol hardness of 25 was obtained.

Example 38

COMPOSITION OF 1,2,3-PROPANETRIOL TRIS-(3,4-EPOXYCYCLOHEXANECARBOXYLATE) AND PHTHALIC ANHYDRIDE

A mixture was prepared from 6.2 grams of 1,2,3-propanetriol tris-(3,4-epoxycyclohexanecarboxylate) and 2.96 grams of phthalic anhydride. The amounts of diepoxide and anhydride in the mixture were such as to provide 1 carboxy equivalent for each epoxy equivalent. The mixture was maintained at a temperature of 120° C. for 3 minutes during which time a gel was formed. The gel was subjected to a strong cure at 160° C. for 1.5 hours and converted into a clear, hard, brittle solid having a Barcol hardness of 36.

Example 39

COMPOSITIONS OF ETHYLENE GLYCOL BIS-(3,4-EPOXY-6-METHYLCYCLOHEXANECARBOXYLATE), SUCCINIC ANHYDRIDE AND ADIPIC ACID

A mixture containing 6.76 grams of ethylene glycol bis-(3,4-epoxy-6-methylcyclohexanecarboxylate), 2 grams of succinic anhydride and .88 gram of adipic acid was prepared. The amounts of diepoxide, anhydride and acid in this mixture provided 1 carboxy equivalent of anhydride and .3 carboxy equivalent of acid for each epoxy equivalent of diepoxide. The mixture was heated until a homogeneous melt was obtained. This melt was maintained at 120° C. for a period of 17 minutes during which time a gel was formed. The gel thus formed was subjected to a cure at 160° C. for a period of 2 hours. After this time a light, yellow, tough solid having a Barcol hardness of 25 was obtained.

*Example 40*

COMPOSITION OF 1,6-HEXANEDIOL BIS-(3,4-EPOXYCYCLOHEXANECARBOXYLATE), PHTHALIC ANHYDRIDE AND ADIPIC ACID

There was prepared a mixture containing 7.7 grams of 1,6-hexanediol bis-(3,4-epoxycyclohexanecarboxylate), 1.5 grams of phthalic anhydride and 0.8 gram of adipic acid. The foregoing amounts in the mixture provided 0.5 carboxy equivalent of phthalic anhydride and 0.25 carboxy equivalent of adipic acid for each epoxy equivalent of the diepoxide. The mixture was heated until a homogeneous melt was obtained. The melt, thus formed, was subjected to a strong cure at a temperature of about 160° C. for six hours. A strong, tough resin which had a Barcol hardness of 8 was obtained.

*Example 41*

POLYESTER OF SUCCINIC ANHYDRIDE AND GLYCEROL

One hundred and ten grams (3 mols) of succinic anhydride and 31 grams (1 mol) of glycerol were mixed in a round-bottomed flask and heated to a temperature of 135° C. to 145° C. The flask and contents were kept at this temperature for a period of seven hours. During this period, water was continuously removed from the reaction mixture by distillation. There was obtained a polyester which was a semi-solid at room temperature and a light yellow liquid at 100° C.

*Example 42*

COMPOSITIONS OF ETHYLENE GLYCOL BIS-(3,4-EPOXY-6-METHYLCYCLOHEXANECARBOXYLATE), MALEIC ANHYDRIDE AND SUCCINIC ANHYDRIDE GLYCEROL POLYESTER

A mixture was prepared from 6.8 grams of ethylene glycol bis-(3,4-epoxy-6-methylcyclohexanecarboxylate), 1.5 grams of maleic anhydride and 1.0 gram of succinic anhydride-glycerol polyester prepared by condensing 3 mols of succinic anhydride with 1 mol of glycerol. The amounts of diepoxide anhydride and polyester in the mixture provided 0.75 carboxy equivalent of anhydride and 0.2 carboxy equivalent of polyester for each epoxy equivalent of diepoxide. The mixture was heated until a homogeneous melt was formed and maintained at about 120° C. for 5 minutes. A gel was formed during this time and was subjected to a temperature of 160° C. for 1.5 hours. There was obtained an amber colored, tough, solid product having a Barcol hardness of 33.

*Example 43*

COMPOSITIONS OF ETHYLENE GLYCOL BIS-(3,4-EPOXY-6-METHYLCYCLOHEXANECARBOXYLATE), SUCCINIC ANHYDRIDE AND SUCCINIC ANHYDRIDE-GLYCEROL POLYESTER

A mixture was prepared from 6.76 grams of ethylene glycol bis-(3,4-epoxy-6-methylcyclohexanecarboxylate), 1.6 grams of succinic anhydride and 1.49 grams of succinic anhydride-glycerol polyester which was formed by condensing 3 mols of succinic anhydride and 1 mol of glycerol. The above specified amounts of diepoxide, succinic anhydride and succinic anhydride-glycerol polyester provided a 0.8 carboxy equivalent of anhydride and 0.3 carboxy equivalent of polyester for each epoxy equivalent of diepoxide. The mixture was heated until a homogeneous melt was obtained. The melt was heated at a temperature of 120° C. for 7 minutes during which time a gel formed. The gel was maintained at a temperature of about 160° C. for a period of 2 hours and there was obtained during this time a light yellow, tough solid having a Barcol hardness of 26.

*Example 44*

COMPOSITIONS OF 1,2,3-PROPANETRIOL TRIS-(3,4-EPOXYCYCLOHEXANECARBOXYLATE), SUCCINIC ANHYDRIDE AND SUCCINIC ANHYDRIDE-GLYCEROL POLYESTER

A mixture was prepared from 6.2 grams of 1,2,3-propanetriol tris-(3,4-epoxycyclohexanecarboxylate), 1.2 grams of succinic anhydride and .9 gram of succinic anhydride-glycerol polyester formed from 3 mols of succinic anhydride and 1 mol of glycerol. The mixture contained amounts of diepoxide, anhydride and polyester in amounts providing a 0.6 carboxy equivalent of anhydride and 0.2 carboxy equivalent of polyester for each epoxy equivalent of diepoxide. The mixture was heated until a homogeneous melt was obtained and was subjected to a temperature of 120° C. for a period of 3 minutes. A gel formed during this time and was subjected to a 160° C. curing for a period of 1.5 hours. After this curing a hard, brittle solid having a Barcol hardness of 33 was obtained.

What is claimed is:

1. A curable composition comprising a polyepoxide compound characterized by the general formula:

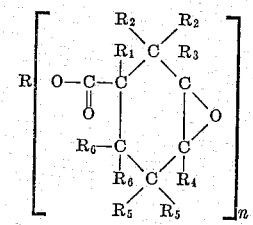

wherein $n$ represents an integer from 2 to 3; R represents a group from the class of divalent aliphatic, divalent oxa-aliphatic, and trivalent aliphatic groups; and $R_1$, $R_2$, $R_3$, $R_4$, $R_5$ and $R_6$ represent monovalent groups from the class of hydrogen and alkyl groups having from 1 to 4 carbon atoms; a polycarboxylic acid anhydride in an amount having X carboxy equivalents for each epoxy equivalent of said polyepoxide compound; and a polycarboxylic compound in an amount having Y carboxy equivalents for each epoxy equivalent of said polyepoxide compound; wherein X is a number from 0.1 to 4.0, Y is a number from 0.0 to 1.0; the sum of X and Y is not greater than 4.0 and $X/Y$ is at least 1.

2. A cured composition obtained by heating the curable composition claimed in claim 1.

3. A curable composition comprising a triepoxide characterized by the general formula:

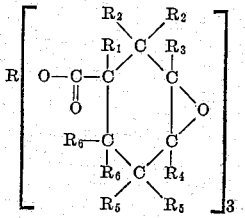

wherein R represents a trivalent aliphatic group and $R_1$, $R_2$, $R_3$, $R_4$, $R_5$ and $R_6$ represent monovalent groups from the class of hydrogen and alkyl groups having from 1 to 4 carbon atoms; a polycarboxylic acid anhydride in an amount having X carboxy equivalents for each epoxy equivalent of said triepoxide; and a polycarboxylic compound in an amount having Y carboxy equivalents for each epoxy equivalent of said triepoxides; wherein X is a number from 0.1 to 4.0, Y is a number from 0.0 to 1.0, the sum of X and Y is not greater than 4.0 and $X/Y$ is at least 1.

4. A cured composition obtained by heating the curable composition claimed in claim 3.

5. A curable composition comprising a diepoxide characterized by the general formula:

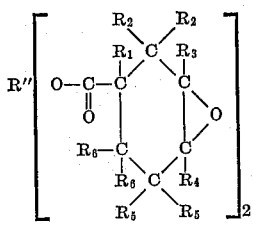

wherein R" represents a group from the class of alkylene and oxa-alkylene groups; and $R_1$, $R_2$, $R_3$, $R_4$, $R_5$ and $R_6$ represent monovalent groups from the class of hydrogen and alkyl groups having from 1 to 4 carbon atoms; a polycarboxylic acid anhydride in an amount having X carboxy equivalents for each epoxy equivalent of said diepoxide; and a polycarboxylic compound in an amount having Y carboxy equivalents for each epoxy equivalent of said diepoxide; wherein X is a number from 0.1 to 4.0, Y is a number from 0.0 to 1.0, the sum of X and Y is not greater than 4.0 and $X/Y$ is at least 1.

6. A cured composition obtained by heating the curable composition claimed in claim 5.

7. A curable composition comprising a triepoxide characterized by the general formula:

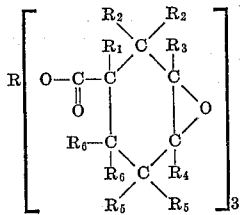

wherein R represents a trivalent aliphatic group; and $R_1$, $R_2$, $R_3$, $R_4$, $R_5$ and $R_6$ represent monovalent groups from the class of hydrogen and alkyl groups having from 1 to 4 carbon atoms; a polycarboxylic acid anhydride in an amount having X carboxy equivalents for each epoxy equivalent of said triepoxide; and a polycarboxylic compound in an amount having Y carboxy equivalents for each epoxy equivalent of said triepoxide; wherein X is a number from 0.5 to 2.0, Y is a number from 0.0 to 1.0, the sum of X and Y is not greater than 2.0 and $X/Y$ is at least 1.

8. A cured composition obtained by heating the curable composition claimed in claim 7.

9. A curable composition comprising a diepoxide characterized by the general formula:

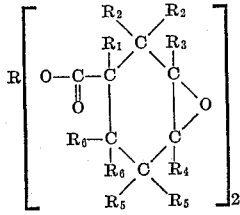

wherein R represents a group from the class of alkylene and oxa-alkylene groups; and $R_1$, $R_2$, $R_3$, $R_4$, $R_5$ and $R_6$ represent monovalent groups from the class of hydrogen and alkyl groups having from 1 to 4 carbon atoms; a polycarboxylic acid anhydride in an amount having X carboxy equivalents for each epoxy equivalent of said diepoxide; and a polycarboxylic compound having Y carboxy equivalents for each epoxy equivalent of said diepoxide; wherein X is a number from 0.5 to 2, Y is a number from 0.0 to 1.0, the sum of X and Y is not greater than 2.0 and $X/Y$ is at least 1.

10. A cured composition obtained by heating the curable composition claimed in claim 9.

11. A curable composition comprising an alkanetriol tris-(3,4-epoxycyclohexanecarboxylate) having no other substituents than from 0–5 lower alkyl substituents on each cyclohexane ring; a polycarboxylic acid anhydride in an amount having X carboxy equivalents for each epoxy equivalent of said alkanetriol tris-(3,4-epoxycyclohexanecarboxylate); and a polycarboxylic compound having Y carboxy equivalents for each epoxy equivalent of said alkanetriol tris-(3,4-epoxycyclohexanecarboxylate); wherein X is a number from 0.1 to 4.0, Y is a number from 0.0 to 1.0, the sum of X and Y is not greater than 4.0 and $X/Y$ is at least 1.

12. A cured composition obtained from the curable composition claimed in claim 11.

13. A curable composition comprising an alkanetriol tris-(3,4-epoxycyclohexanecarboxylate) having no other substituents than from 0–5 lower alkyl substituents on each cyclohexane ring; a polycarboxylic acid anhydride in an amount having X carboxy equivalents for each epoxy equivalent of said alkanetriol tris-(3,4-epoxycyclohexanecarboxylate); and a polycarboxylic compound having Y carboxy equivalents for each epoxy equivalent of said alkanetriol tris-(3,4-epoxycyclohexanecarboxylate), wherein X is a number from 0.5 to 2.0, Y is a number from 0.0 to 1.0, the sum of X and Y is not greater than 2.0, and $X/Y$ is at least 1.

14. A cured composition obtained from the curable composition claimed in claim 13.

15. A curable composition comprising 1,6-hexanediol bis-(3,4-epoxycyclohexanecarboxylate) and maleic anhydride in an amount having from 0.5 to 2.0 carboxy equivalents for each epoxy equivalent of said 1,6-hexanediol bis-(3,4-epoxycyclohexanecarboxylate).

16. A cured composition obtained by heating the curable composition claimed in claim 15.

17. A curable composition comprising 1,6-hexanediol bis-(3,4-epoxycyclohexanecarboxylate) and succinic anhydride in an amount having from 0.5 to 2.0 carboxy equivalents for each epoxy equivalent of said 1,6-hexanediol bis-(3,4-epoxycyclohexanecarboxylate).

18. A cured composition obtained by heating the curable composition claimed in claim 17.

19. A curable composition comprising 1,6-hexanediol bis-(3,4-epoxycyclohexanecarboxylate) and methyltetrahydrophthalic anhydride in an amount having from 0.5 to 2.0 carboxy equivalents for each epoxy equivalent of said 1,6 - hexanediol bis - (3,4-epoxycyclohexanecarboxylate).

20. A cured composition obtained by heating the curable composition claimed in claim 19.

21. A curable composition comprising 1,6-hexanediol bis-(3,4-epoxycyclohexanecarboxylate) and itaconic anhydride in an amount having from 0.5 to 2.0 carboxy equivalents for each epoxy equivalent of said 1,6-hexanediol bis-(3,4-epoxycyclohexanecarboxylate).

22. A cured composition obtained by heating the curable composition claimed in claim 21.

23. A curable composition comprising 1,6-hexanediol bis-(3,4 - epoxycyclohexanecarboxylate) and polyadipic anhydride in an amount having from 0.5 to 2.0 carboxy equivalents for each epoxy equivalent of said 1,6-hexanediol bis-(3,4-epoxycyclohexanecarboxylate).

24. A cured composition obtained by heating the curable composition claimed in claim 23.

25. A curable composition comprising 1,6-hexanediol bis-(3,4-epoxycyclohexanecarboxylate) and phthalic anhydride in an amount having from 0.5 to 2.0 carboxy equivalents for each epoxy equivalent of said 1,6-hexanediol bis-(3,4-epoxycyclohexanecarboxylate).

26. A cured composition obtained by heating the curable composition claimed in claim 25.

27. A curable composition comprising 1,6-hexanediol bis - (3,4 - epoxycyclohexanecarboxylate) and hexachloroendo - methylenetetrahydrophthalic anhydride in an amount having from 0.5 to 2.0 carboxy equivalents for each epoxy equivalent of said 1,6-hexanediol bis-(3,4-epoxycyclohexanecarboxylate).

28. A cured composition obtained by heating the curable composition claimed in claim 27.

29. A curable composition comprising diethylene glycol bis-(3,4-epoxy-6-methylcyclohexanecarboxylate) and phthalic anhydride in an amount having from 0.5 to 2.0 carboxy equivalents for each epoxy equivalent of said diethylene glycol bis-(3,4-epoxy-6-methylcyclohexanecarboxylate).

30. A cured composition obtained by heating the curable composition claimed in claim 29.

31. A curable composition comprising 2-ethyl-1,3-hexanediol bis - (3,4-epoxycyclohexanecarboxylate) and phthalic anhydride in an amount having from 0.5 to 2.0 carboxy equivalents for each epoxy equivalent of said 2-ethyl - 1,3 - hexanediol bis-(3,4-epoxycyclohexanecarboxylate).

32. A cured composition obtained by heating the curable composition claimed in claim 31.

33. A curable composition comprising 3-methyl-1,5-pentanediol bis-(3,4-epoxycyclohexanecarboxylate) and phthalic anhydride in an amount having from 0.5 to 2.0 carboxy equivalents for each epoxy equivalent of said 3-methyl-1,5-pentanediol bis-(3,4-epoxycyclohexanecarboxylate).

34. A cured composition obtained by heating the curable composition claimed in claim 33.

35. A curable composition comprising triethylene glycol bis-(3,4-epoxycyclohexanecarboxylate) and phthalic anhydride in an amount having from 0.5 to 2.0 carboxy equivalents for each epoxy equivalent of said triethylene glycol bis-(3,4-epoxycyclohexanecarboxylate).

36. A cured composition obtained by heating the curable composition claimed in claim 35.

37. A curable composition comprising ethylene glycol bis-(3,4 - epoxy - 6 - methylcyclohexanecarboxylate) and phthalic anhydride in an amount having from 0.5 to 2.0 carboxy equivalents for each epoxy equivalent of said ethylene glycol bis-(3,4-epoxy-6-methylcyclohexanecarboxylate).

38. A cured composition obtained by heating the curable composition claimed in claim 37.

39. A curable composition comprising 2,2-diethyl-1,3-propanediol bis-(3,4-epoxycyclohexanecarboxylate) and phthalic anhydride in an amount having from 0.5 to 2.0 carboxy equivalents for each epoxy equivalent of said 2,2-diethyl-1,3-propanediol bis-(3,4-epoxycyclohexanecarboxylate).

40. A cured composition obtained by heating the curable composition claimed in claim 39.

41. A curable composition comprising 1,1,1-trimethylolpropane tris-(3,4 - epoxycyclohexanecarboxylate) and succinic anhydride in an amount having from 0.5 to 2.0 carboxy equivalent for each epoxy equivalent of said 1,1,1 - trimethylolpropane tris-(3,4-epoxycyclohexanecarboxylate).

42. A cured composition obtained by heating the curable composition claimed in claim 41.

43. A curable composition comprising 1,6-hexanediol bis - (3,4-epoxycyclohexanecarboxylate); phthalic anhydride in an amount having X carboxy equivalents for each epoxy equivalents of said 1,6-hexanediol bis-(3,4-epoxycyclohexanecarboxylate); and adipic acid having Y carboxy equivalents for each epoxy equivalent of said 1,6 - hexanediol bis-(3,4 - epoxycyclohexanecarboxylate); wherein X is a number from .5 to 2.0; Y is a number from 0.0 to 1.0, the sum of X and Y is not greater than 2.0 and $X/Y$ is at least 1.

44. A cured composition obtained by heating the curable composition claimed in claim 43.

45. A curable composition comprising ethylene glycol bis-(3,4-epoxy-6-methylcyclohexanecarboxylate); succinic anhydride in an amount having X carboxy equivalents for each epoxy equivalent of said ethylene glycol bis-,3,4-epoxy-6-methylcyclohexanecarboxylate); and adipic acid having Y carboxy equivalents for each epoxy equivalent of said ethylene glycol bis-(3,4-epoxy-6-methylcyclohexanecarboxylate); wherein X is a number from .5 to 2.0; Y is a number from 0.0 to 1.0, the sum of X and Y is not greater than 2.0 and $X/Y$ is at least 1.

46. A cured composition obtained by heating the curable composition claimed in claim 45.

47. A curable composition comprising ethylene glycol bis - (3,4-epoxy-6-methylcyclohexanecarboxylate), maleic anhydride in an amount having X carboxy equivalent for each epoxy equivalent of said ethylene glycol bis-(3,4-epoxy-6-methylcyclohexanecarboxylate); and a succinic anhydride-glycerol polycarboxy polyester having Y carboxy equivalent for each epoxy equivalent of said ethylene glycol bis-(3,4-epoxy-6-methylcyclohexanecarboxylate); wherein X is a number from .5 to 2.0, Y is a number from 0.0 to 1.0, the sum of X and Y is not greater than 2.0, and $X/Y$ is at least 1.

48. A cured composition obtained by heating the curable composition claimed in claim 47.

49. A curable composition comprising ethylene glycol bis-(3,4-epoxy-6-methylcyclohexanecarboxylate); succinic anhydride in an amount having X carboxy equivalent for each epoxy equivalent of said ethylene glycol bis-(3,4-epoxy-6-methylcyclohexanecarboxylate); and a succinic anhydride-glycerol polycarboxy polyester having Y carboxy equivalents for each epoxy equivalent of said ethylene glycol bis-(3,4-epoxy-6-methylcyclohexanecarboxylate); wherein X is a number from .5 to 2.0, Y is a number from 0.0 to 1.0, the sum of X and Y is not greater than 2.0, and $X/Y$ is at least 1.

50. A cured composition obtained by heating the curable composition claimed in claim 49.

51. A curable composition comprising 1,2,3-propanetriol tris - (3,4 - epoxycyclohexanecarboxylate); succinic anhydride in an amount having X carboxy equivalent for each epoxy equivalent of said 1,2,3-propanetriol tris-(3,4-epoxycyclohexanecarboxylate); and a succinic anhydride-glycerol polycarboxy polyester having Y carboxy equivalents for each epoxy equivalent of said 1,2,3-propanetriol tris - (3,4 - epoxycyclohexanecarboxylate); wherein X is a number from .5 to 2.0, Y is a number from 0.0 to 1.0, the sum of X and Y is not greater than 2.0, and $X/Y$ is at least 1.

52. A cured composition obtained by heating the curable composition claimed in claim 51.

References Cited in the file of this patent

UNITED STATES PATENTS

| | | |
|---|---|---|
| 2,527,806 | Foster | Oct. 31, 1950 |
| 2,607,761 | Seymour | Aug. 19, 1952 |
| 2,623,023 | Koroly | Dec. 23, 1952 |
| 2,712,535 | Fisch | July 15, 1955 |
| 2,720,500 | Cody | Oct. 11, 1955 |
| 2,745,847 | Phillips et al. | May 15, 1956 |
| 2,764,575 | Kohler et al. | Sept. 25, 1956 |
| 2,768,153 | Shokal | Oct. 23, 1956 |